(12) United States Patent
Kim et al.

(10) Patent No.: US 7,088,897 B2
(45) Date of Patent: Aug. 8, 2006

(54) DOUBLE-COATED OPTICAL FIBER

(75) Inventors: Young-Seok Kim, Kumi-shi (KR); Sung-Koog Oh, Kumi-shi (KR); Jae-Ho Lee, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 10/783,244

(22) Filed: Feb. 20, 2004

(65) Prior Publication Data
US 2004/0223716 A1  Nov. 11, 2004

(30) Foreign Application Priority Data
May 7, 2003  (KR)  .................. 10-2003-0029031

(51) Int. Cl.
*G02B 6/02* (2006.01)
*G02B 6/22* (2006.01)

(52) U.S. Cl. ............ 385/128; 385/123; 385/126; 385/127; 385/141; 385/144

(58) Field of Classification Search ................ 385/128
See application file for complete search history.

(56) References Cited

U.S. PATENT DOCUMENTS 4,877,306 A * 10/1989 Kar ........................ 385/128
5,212,757 A * 5/1993 Brownlow et al. ......... 385/127
6,316,516 B1 * 11/2001 Chien et al. ............... 522/91

* cited by examiner

*Primary Examiner*—Frank G. Font
*Assistant Examiner*—Ryan Lepisto
(74) *Attorney, Agent, or Firm*—Cha & Reiter, L.L.C.

(57) ABSTRACT

A double-coated optical fiber and method includes providing a core that serves as a light transmission medium. A cladding surrounds the core and has a smaller reflective index than the core. A primary coating layer is formed of a UV-cured polymer around the clad, and a secondary coating layer is formed of a UV-cured polymer around the primary coating layer, to a thickness ranging from about 22 to 37.5 μm in order to obtain a coating strip force ranging from about 1.0 to 1.63 N and a dynamic stress corrosion parameter ranging from 20 to 29. The primary and secondary coating layers can be formed by a wet on wet or wet on dry process.

10 Claims, 4 Drawing Sheets

DOUBLE-COATED OPTICAL FIBER

CLAIM OF PRIORITY

This application claims priority under 35 U.S.C. § 119 to an application entitled "Double-Coated Optical Fiber," filed in the Korean Intellectual Property Office on May 7, 2003 and assigned Serial No. 2003-29031, the contents of which are incorporated herein by reference.

BACKGROUND OF THE INVENTION

1. Field of the Invention

The present invention relates generally to an optical fiber. More particularly, the present invention relates to a double-coated optical fiber and its coating strip force.

2. Description of the Related Art

In general, an optical fiber comprises a core that provides a light transmitting medium, a cladding that surrounds the core for trapping light in the core; A coating layer surrounds the cladding, for protecting the inside of the fiber from an external environment.

The coating layer is a rather significant component that determines physical fiber optic characteristics such as bending, chemical resistance, and mechanical strength. In order to measure the mechanical characteristics of an optical fiber, it is common to the art that both a dynamic fatigue test and a coating strip test are performed to evaluate the quality the optical fiber.

The dynamic fatigue test is used to estimate the mechanical life and the degradation of the optical fiber during usage, because the optical fiber undergoes physical changes due to external factors when it is applied in actual field use.

A dynamic stress corrosion parameter (Nd) is defined as a ratio of the change of fracture stress distribution with respect to the change of an applied stress rate. The dynamic stress corrosion parameter is equal to or greater than 18 in accordance with FOTP-28 under the test standard of GR-20-CORE 4.4.4. The coating strip test is normally performed using a tensile testing machine that measures the tensile force to strip the coating from the surface of the cladding. The tensile force is also referred to as a coating strip force. The coating strip force testing tests for the adhesive force of the coating layer.

The peak value shall range from 1.0 to 9.0N in accordance with FOTP-178 under GR-20-CORE 4.4.2.

If the coating strip force is too great, this value is not ideal in that it leads to fiber breakage and excessive coating residue. However, on the contrary, if the coating strip force is too small, the adhesive force between the optical fiber and the coating layer is insufficient and coating delamination occurs. Therefore, it is of extreme importance to set the coating strip force appropriately.

With regard to the mechanical characteristics of a double-coated optical fiber, UV curing conditions and physical, chemical, and thermal tendencies are well known. However, with regard to the characteristics over a passage of time, the geometrical coating structure and mechanical characteristics of the optical fiber is unknown. For example, there is a specification that the diameter of an optical fiber is 125±1.0 μm and the outer diameter of a secondary coating layer is 245±10 μm under the existing provisions. Yet, there is no explicit specification for the outer diameter of a primary coating layer (test standards: IEC 60793-2, GR-20-CORE, TIA/EIA-492c000, etc.).

SUMMARY OF THE INVENTION

It is, therefore, an object of the present invention to provide a double-coated optical fiber that satisfies mechanical characteristic requirements and has an increased usage lifespan.

The above object is achieved by providing a double-coated optical fiber having a core that serves as a light transmission medium, a cladding that surrounds the core and has a smaller reflective index than the core, a primary coating layer that is formed of a UV-cured polymer around the cladding, and a secondary coating layer that is formed of a UV-cured polymer around the primary coating layer. The thickness of the secondary coating layer ranges from 22 to 37.5 μm in order to obtain a coating strip force ranging from 1.0 to 1.63N and a dynamic stress corrosion parameter ranging from 20 to 29.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
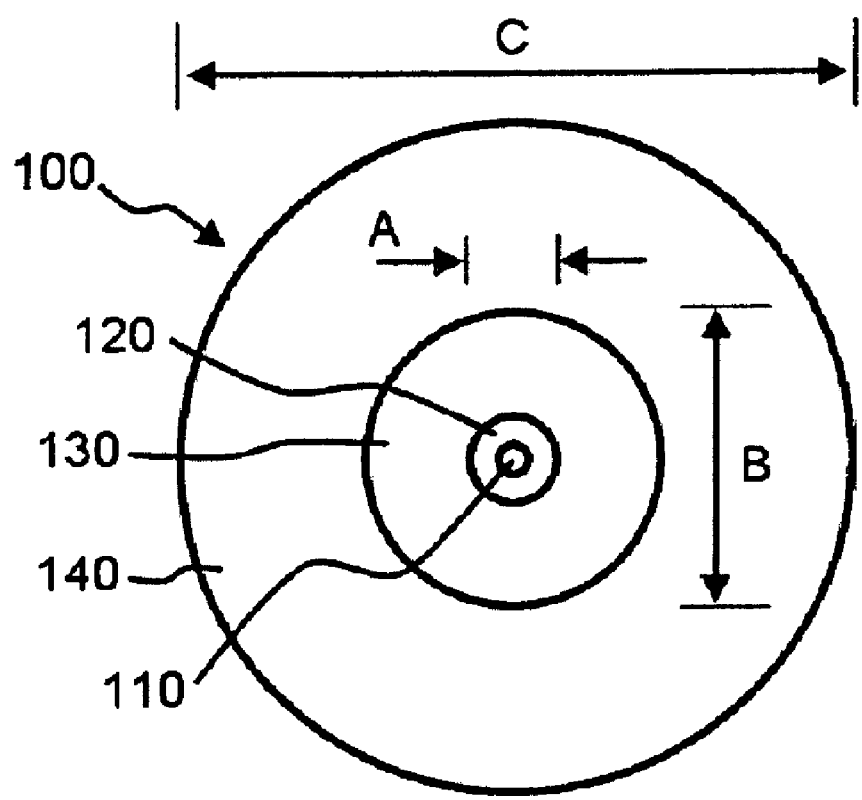
FIG. 1 shows a sectional view of a double-coated optical fiber according to a preferred embodiment of the present invention.

A preferred embodiment of the present invention will be described herein below with reference to the accompanying drawings. It is to be understood by the artisan that the claimed invention is not limited to the embodiment shown in the drawings. For example, there are many modifications that could be made by a person of ordinary skill in the art that lies with the spirit and scope of the invention. For the purposes of clarity and simplicity, well-known functions or constructions are not described in detail as they would obscure the invention in unnecessary detail.

FIG. 1 is a sectional view of a double-coated optical fiber according to a preferred embodiment of the present invention. Referring to FIG. 1, the optical fiber 100 includes a core 110, a cladding 120, a primary coating layer 130, and a secondary coating layer 140.

All of the above components normally are arranged around a common center point. The core 110 is positioned at the center of the optical fiber 100. Accordingly, the core serves as a light transmission medium and exhibits a preset reflective index distribution to permit the passage of light therethrough.

The cladding 120 surrounds the core 110 and has a lower reflective index than the core 110. It functions to trap light in the core 110. The core 110 and the cladding 120 are collectively referred to as "bare glass." The bare glass (110 and 120) is about 125 μm in diameter.

The primary coating layer 130 has a smaller modulus of elasticity than the secondary coating layer 140 to obtain an adhesive force with respect to the clad 120 and stability in a wide temperature range. It is formed of a UV-cured polymer and has a diameter (B) ranging from about 180 to 210 μm.

In order to protect the inside of the fiber against an external shock, the secondary coating layer 140 has a larger modulus of elasticity than the primary coating layer 130, and functions to block externally introduced moisture. For a mean coating strip force ranging from about 1.0 to 1.63N and a dynamic stress corrosion parameter ranging from about 20 to 29, the secondary coating layer 140 has a thickness between about 22 and 37.5 μm.

The primary and secondary coating layers 130 and 140 are formed by drawing a bare optical fiber from an optical preform, sequentially coating liquid UV-cured polymers having different properties on the bare optical fiber, irradiating the UV-cured polymers with UV light, and curing them. This process is referred to as "wet on wet".

Alternatively, the primary and secondary coating layers 130 and 140 also can be formed by drawing a bare optical fiber from a fiber preform, coating a liquid UV-cured polymer on the bare optical fiber, curing the coated polymer with UV irradiation, coating another liquid UV-cured polymer having different properties on the coated optical fiber, and curing the coated polymer with UV irradiation. This process is referred to as "wet on dry".

In the present invention, a thickness range (C−B)/2 produces mean coating strip force of about 1.0–1.63N, and about a 20–29 dynamic stress corrosion parameter is determined for the secondary coating layer 140 by clarifying changes in the mechanical characteristics of the secondary coating layer 140 with respect to thickness and aging time.

Figure 2:
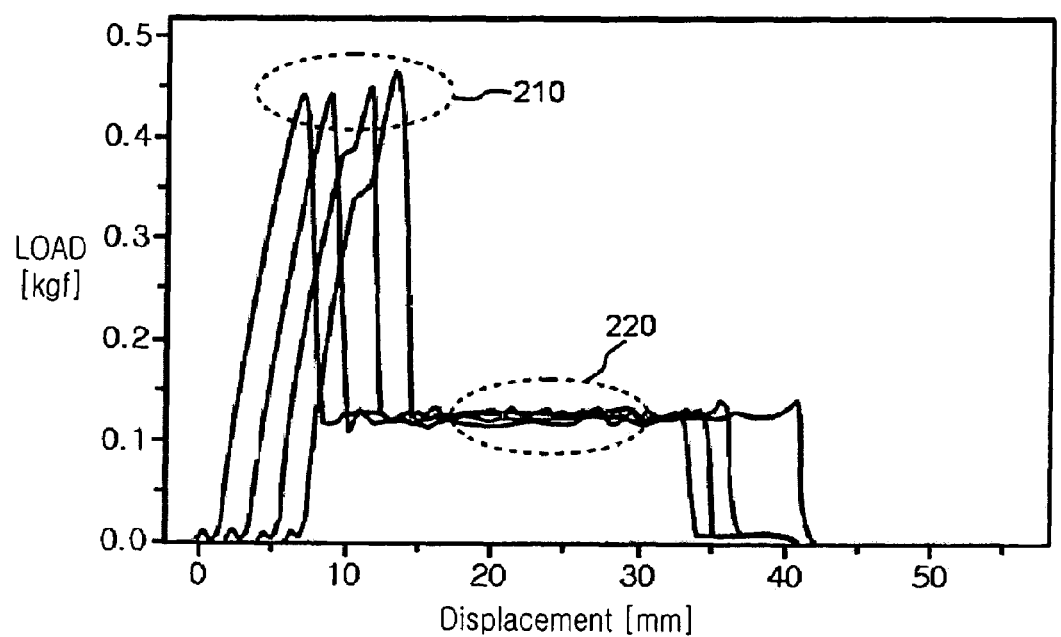
FIG. 2 shows a graph illustrating coating strip test results for a secondary coating layer illustrated in FIG. 1.

FIG. 2 is a graph highlighting coating strip test results for the secondary coating layer 140 illustrated in FIG. 1. The coating strip test is performed using a tensile testing machine and a coating stripper. When the primary and secondary coating layers 130 and 140 are stripped off from the clad 120 with a load or coating strip force equal to or greater than a threshold, a peak value 210 and a mean value 220 are obtained.

Figure 3:
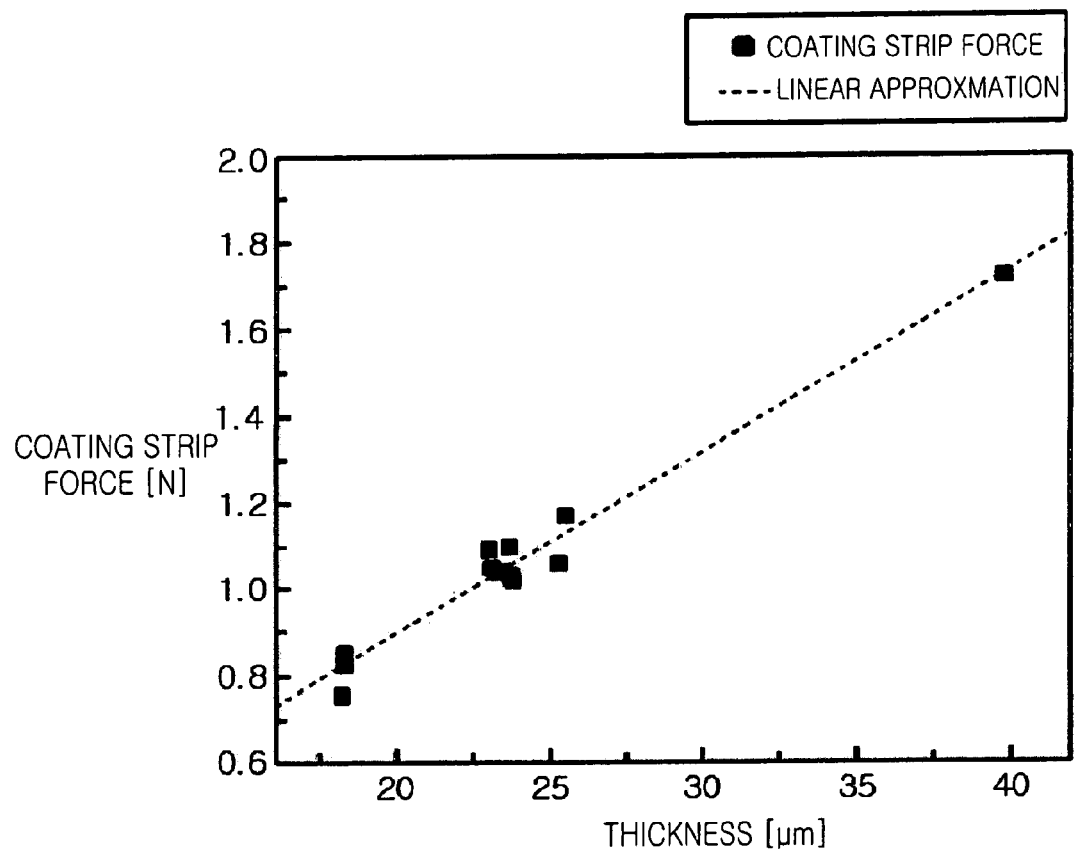
FIG. 3 shows a graph illustrating a coating strip force distribution for each secondary coating layer thickness.

FIG. 3 shows a graph illustrating a mean coating strip force for each thickness of the secondary coating layer 140 illustrated in FIG. 1. As noted from the linear approximation, as the thickness (C−B)/2 of the secondary coating layer 140 increases, a mean coating strip force linearly increases. However, a peak coating strip force has no apparent tendency.

The coating strip force of the secondary coating layer 140 is related to UV curing conditions and coating properties associated with photopolymerization. If the case where an insufficient amount of UV light is radiated onto the primary and secondary coating layers 130 and 140, there is an uncured polymer gel that remains on the primary and secondary coating layers 130 and 140. With the passage of time, part of the uncured polymer gel on the primary and secondary coating layers 130 and 140 exposed to sunlight is volatilized, and the residue still remains. The residue is gradually post-cured with time, which changes the mechanical properties of the primary and secondary coating layers 130 and 140.

Figure 4:
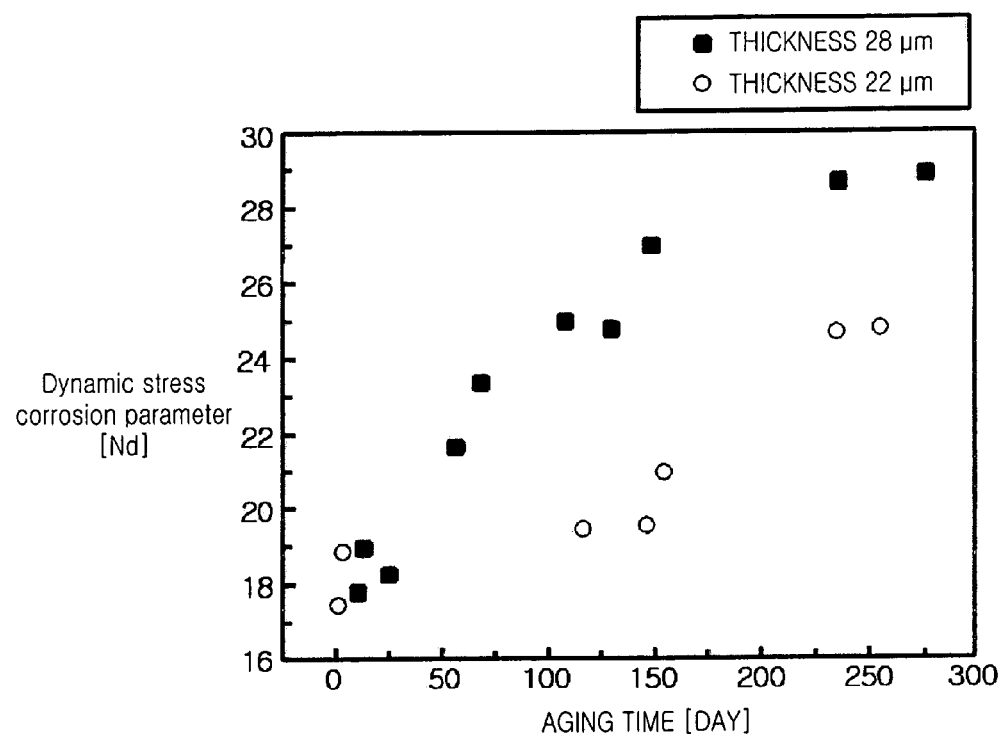
FIG. 4 shows a graph illustrating a dynamic stress corrosion parameter distribution for each aging time of the secondary coating layer illustrated in FIG. 1.

FIG. 4 provides a graph illustrating a dynamic stress corrosion parameter distribution for each aging time of the secondary coating layer 140 in the cases where it is 22 μm and 28 μm. Commonly in both cases, the dynamic stress corrosion parameter increases with time. Yet, the specific dynamic stress corrosion parameter variations are different for the different secondary coating layer thicknesses. The dynamic stress corrosion parameter ranges from about 20 to 29.

In accordance with the present invention as described above, the clarified mechanical properties of the secondary coating layer with respect to thickness and time enables an optimal design of the geometrical structure of a double-coated optical fiber. Furthermore, formation of the secondary coating layer to a thickness between about 22 and 37.5 μm produces a mean coating strip force ranging from about 1.0 to 1.63N and a dynamic stress corrosion parameter ranging from about 20 to 29.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A double-coated optical fiber comprising:
   a core being a light transmission medium;
   a cladding surrounding the core and having a smaller reflective index than the core;
   a primary coating layer formed of a UV-cured polymer around the cladding; and
   a secondary coating layer formed of a UV-cured polymer around the primary coating layer, to a thickness ranging from about 22 to 37.5 μm in order to obtain a coating strip force ranging from about 1.0 to 1.63 N,
   wherein the secondary coating layer has a dynamic stress corrosion parameter ranging from about 20 to 29.

2. The double-coated optical fiber of claim 1, wherein a diameter of the primary coating layer is about 180 to 210 μm.

3. The double-coated optical fiber of claim 1, wherein the primary coating layer has a smaller modulus of elasticity than the secondary coating layer.

4. The double-coated optical fiber of claim 1, wherein a combined diameter of the core and cladding is about 125 um.

5. A method of manufacturing a double-coated optical fiber comprising:
   (a) providing a core to serve as a light transmission medium;
   (b) surrounding the core with a cladding, said cladding having a smaller reflective index than the core;
   (c) arranging a primary coating layer formed of a UV-cured polymer around an exterior of the cladding; and
   (d) arranging a secondary coating layer around an exterior of the primary coating, wherein said secondary coating layer being formed of a UV-cured polymer around the primary coating layer, to a thickness ranging from about 22 to 37.5 μm in order to obtain a coating strip force ranging from about 1.0 to 1.63N,
   wherein the secondary coating layer has a dynamic stress corrosion parameter ranging from about 20 to 29.

6. The method according to claim 5, wherein a diameter of the primary coating layer is about 180 to 210 μm.

7. The method according to claim 5, wherein the primary coating layer has a smaller modulus of elasticity than the secondary coating layer.

8. The method according to claim 5, wherein a combined diameter of the core and cladding is about 125 um.

9. The method according to claim 5, wherein the primary and second coating layers provided in step (c) and (d) are formed by a wet on wet process comprising the steps of:
   (i) drawing a bare optical fiber from an optical perform;
   (ii) sequentially coating liquid UV-cured polymers having different properties onto the bare optical fiber from step (i);
   (iii) irradiating the UV-cured polymers with UV light; and
   (iv) curing the polymers recited in sub-step (iii).

10. The method according to claim 5, wherein the primary and second coating layers provided in step (c) and (d) are formed by a wet on dry process comprising the steps of:
   (i) drawing a bare optical fiber from an optical perform;
   (ii) coating a first liquid UV-cured polymer on the optical fiber from step (i);
   (iii) curing the coated polymer by irradiating with UV light;
   (iv) coating a second liquid UV-cured polymer having different properties on the cured coated optical from step (iii); and
   (v) curing the coated polymer from step (iv) by applying UV radiation.

\* \* \* \* \*